US005686852A

United States Patent [19]

Solbrig et al.

[11] Patent Number: 5,686,852

[45] Date of Patent: Nov. 11, 1997

[54] CIRCUIT ARRANGEMENT FOR FORMING THE SQUARE ROOT OF AN INPUT SIGNAL

[75] Inventors: Michael Solbrig; Matthias Tschentscher, both of Berlin, Germany

[73] Assignee: Deutsche Forschungsanstalt für Luft- und Raumfahrt e.V., Köln, Germany

[21] Appl. No.: 645,226

[22] Filed: May 13, 1996

[30] Foreign Application Priority Data

May 11, 1995 [DE] Germany ........................ 195 18 225.1

[51] Int. Cl.[6] ........................ G06F 7/556

[52] U.S. Cl. ........................ 327/347; 327/346

[58] Field of Search ........................ 327/347, 346, 327/348, 349, 350–352, 77

[56] References Cited

U.S. PATENT DOCUMENTS

| | | | |
|---|---|---|---|
| 4,705,969 | 11/1987 | Gross | 327/346 |
| 5,352,944 | 10/1994 | Sacchi et al. | 327/350 |
| 5,471,173 | 11/1995 | Moore et al. | 327/350 |

FOREIGN PATENT DOCUMENTS

| | | | |
|---|---|---|---|
| 2630913 | 2/1977 | Germany | G06G 7/20 |

OTHER PUBLICATIONS

"Analoge Schaltungen"; Seifart; VEB Verlag Technik Berlin, 1987, pp. 366–395.

Burr–Brown Integrated Circuits Data Book, vol. 33, pp. 5–109, 5–114; 1989.

*Primary Examiner*—Toan Tran

*Attorney, Agent, or Firm*—Cohen, Pontani, Lieberman & Pavane

[57] ABSTRACT

A circuit arrangement for forming the square root of an input signal in at least one quadrant. The input signal is fed to the input of a first differential amplifier, the current outputs of which work on two diodes. The two outputs of the first differential amplifier are also connected to the inputs of a second differential amplifier, from one output of which there is a feedback via a diode to one of the outputs of the first differential amplifier. The collectors of the second differential amplifier work on current sources.

17 Claims, 7 Drawing Sheets

CIRCUIT ARRANGEMENT FOR FORMING THE SQUARE ROOT OF AN INPUT SIGNAL

BACKGROUND OF THE INVENTION

1. Field of the Invention

The invention relates to a circuit arrangement for forming the square root of an input signal, using diodes and differential amplifiers.

2. Description of the Prior Art

A circuit arrangement of this type is applicable in the field of measurement and control engineering as well as wherever it is useful to calculate the root of an electrical signal for the purpose of dynamic compression, for example, prior to an analog-digital conversion.

In order to form an electrical signal, the amplitude of which equals the (square) root of an input signal, various circuit arrangements are known which either undertake the formation of the root characteristic curve by means of piecewise approximation from other characteristic curves or trace it back, using mathematical operations that are easier to carry out electronically, for example, multiplication and the division derived therefore, to logarithmic and exponential functions.

A first group of these arrangements are relatively fast but comparatively inexact and are also subject to large temperature coefficients. These arrangements approximate the root characteristic curve from pieces of diode characteristic curves (Seifart, M.: Analog Circuits ["*Analoge Schaltungen*"] VEB Verlag Technik, Berlin, 1987, first ed., pp. 366–395).

The second group of arrangements includes the dividers (inverse multipliers) provided with a feedback, also described in the Seifart publication (pp. 375 ff). In this case, the disadvantage exists that the known arrangements become slower and slower as the requirements for the dynamic range increase. The same disadvantage also applies to another group of root calculators, which also trace the root formation back to other computational operations, namely, the so-called multi-functional converters.

A typical representative of these circuit arrangements (Burr-Brown, Integrated Circuits Data Book, Vol. 33, Burr-Brown Corp. USA 1989, pp. 5–109 to 5–114) is based on logarithmation of the input signal, subsequently valuating it at 0.5, and delogarithmation of the results.

Because in arrangements of this type the components used in logarithmation (for example, diodes or transistors) are often subjected directly to the input signal, such circuits are slow in the environment of the zero point, with the bandwidth depending heavily on the modulation.

SUMMARY OF THE INVENTION

Accordingly, it is an object of the present invention to provide a circuit arrangement for forming the square root which, along with a simple design and a large dynamic range, has a large bandwidth and is less dependent on the modulation, without the root characteristic curve being put together from multiple characteristic curve pieces.

Pursuant to this object, and others which will become apparent hereafter, one aspect of the present invention resides in a circuit arrangement having diodes and two differential amplifiers, whereby the first differential amplifier is wired as a linear voltage-current converter, by virtue of the fact that the first input of the first differential amplifier forms the input of the circuit arrangement, while the second input of the first differential amplifier is connected to a first reference voltage. The current outputs of the first differential amplifier are, respectively, connected to the first terminal of a diode with polarity in the direction of flux, and the second terminals of the diodes are connected to the operating voltage. The collectors of the transistors of the second differential amplifier are fed by current sources.

The first input of the second differential amplifier is connected to the first output of the first differential amplifier and the second input of the second differential amplifier is connected to the second output of the first differential amplifier.

The first output of the second differential amplifier forms the output of the circuit arrangement and the second output is connected via a third diode to an output of the first differential amplifier.

This circuit arrangement works as follows:

The input signal is fed to the first differential amplifier, which is wired as the voltage-current converter, the output current of which flows through two diodes. The voltage drop across the diodes is fed symmetrically to the inputs of the second differential amplifier.

The difference between the currents of the current source connected to a collector of the second differential amplifier and the current that is picked up by the differential amplifier output is fed back into the collector branch of the first differential amplifier. The third diode ensures that the arrangement is functioning in the correct working range. The current source in the emitter branch of the second differential amplifier supplies a current that is twice as large as the sum of the currents of the outputs of the first differential amplifier. At the other output of the second differential amplifier, a current can be drawn that in one quadrant is proportional to the root of the value of the input voltage.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
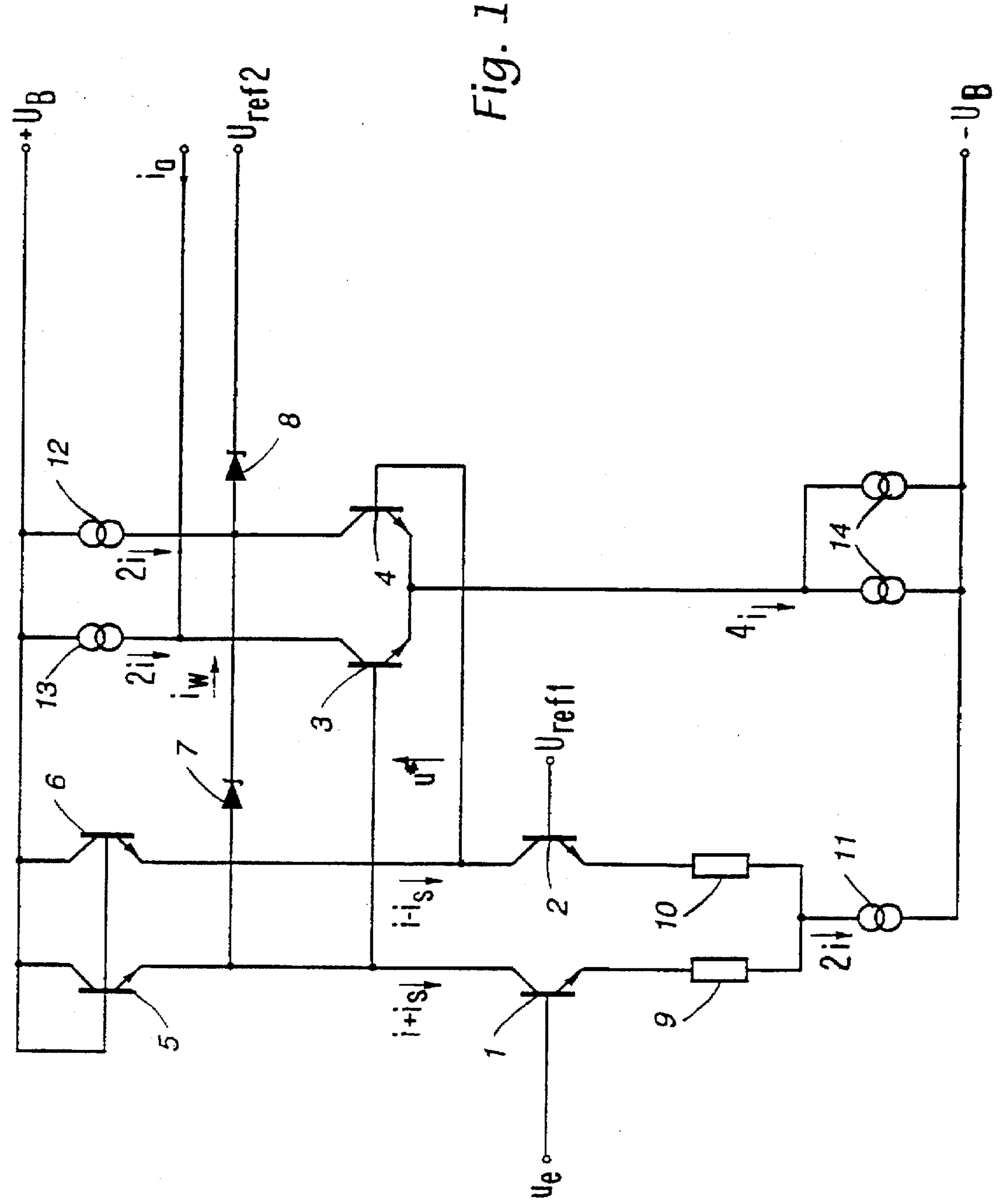
FIG. 1 is a schematic diagram of a circuit arrangement according to a first embodiment of the invention.

In an advantageous embodiment of the invention shown in FIG. 1, two collectors that constitute the outputs of a first differential amplifier (which is formed of transistors 1, 2 and functions as the voltage-current converter) are respectively connected to an operating voltage source via a diode 5, 6. Functioning as diodes here are the base-emitter sections (collector and bases shortcircuited) of two transistors of the same type as those used in the second differential amplifier.

The base of the differential amplifier-transistor 2 is connected to a first reference voltage $U_{ref1}$. The emitter branch of this first differential amplifier is thereby executed with two resistances 9, 10 connected to the transistors, and a current source 11, having one terminal connected to the resistances 9, 10 and another terminal which is connected to a negative operating voltage.

The first input of the second differential amplifier, which is formed of transistors 3, 4, is connected to the first output of the first differential amplifier; and the second input of the second differential amplifier is connected to the second output of the first differential amplifier.

Between the second output of the second differential amplifier and the first output of the first differential amplifier, there is a current feedback in the form of a diode 7, advantageously a Schottky diode, which ensures that the arrangement, depending on the sign in front of the input signal, has either a linear or a root-shaped characteristic curve.

To maintain the working point of the current source 12, a further diode 8 is inserted between the second output of the second differential amplifier and a second reference voltage $U_{ref2}$.

The first output of the second differential amplifier forms the output of the circuit arrangement. Between the first output and the positive pole of the operating voltage, there is also a current source 13. The emitter branch of this differential amplifier, too, is also fed from a current source 14, the output current of which, however, is selected to be twice as large as the total current in the first differential amplifier.

The circuit arrangement functions as follows:

The transistors 1, 2, along with the emitter resistances 9, 10 and the current source 11, form a differential amplifier with current outputs. This converts the input voltage $U_e$ into the currents $i+i_s$ and $i-i_s$. In addition to the current $i_w$, these currents feed the emitters of the transistors or the diodes 5, 6. For their base-emitter voltages, with the precondition that $u_e>0$ and thus that:

$i_s>0$ the following applies:

$$u^*=U_{BE5}-U_{BE6}=U_T\ln(i+i_s+i_w/I_{CO})-U_t\ln(i-i_s/I_{CO})$$

Combined:

$$u^*=U_T\ln(i+i_s+i_w/i-i_s) \quad (1)$$

In the collectors of the transistors 3, 4 flow the currents $2i-i_w$ and $2i+i_w$, and u* lies at the bases of the transistors. It follows from this that:

$$u^*=U_{BE4}-U_{BE3}=U_T\ln(2i+i_w/I_{CO})-U_T\ln(2i-i_{w/ICO})$$

Combined:

$$u^*=U_T\ln(2i+i_w/2i-i_w) \quad (2)$$

By equating the equations (1) and (2) and comparing the arguments of the ln-functions and cross-multiplication, we obtain:

$$i_w^2=4ii_s$$

$$i_w=2*\sqrt{ii_s}$$

From this, $i_a$ can be found:

$$i_a=-i_w=-2*\sqrt{ii_s}$$

Similarly, $i_a$ can be found for the condition that $u_e<0$ that is:

$i_s<0$

It should be noted that no current $i_w$ flows from the second differential amplifier to the first differential amplifier, because the diode 7 is blocked. It then follows for $i_a$ that:

$i_a=-2i_s$

Thus the circuit arrangement in FIG. 1 represents an asymmetrical root converter, which has a root characteristic curve in the $i_a$–$i_s$-diagram for one quadrant ($i_s>0$) and has a linear characteristic curve for a second quadrant ($i_s<0$). What should be noted is that the base currents of the transistors have been ignored in all computations.

Many modifications of this first embodiment are conceivable. For example, a cross-resistance can be arranged between the emitters in the emitter branch of the first differential amplifier 1, 2, whereby a current source is then connected between the emitters and the negative operating current, respectively. These current sources then supply, respectively, a current that has 0.25—the value of the current in the emitter branch of the second differential amplifier 3, 4.

Furthermore, the feedback diode 7 can be arranged between the second output of the first differential amplifier 1, 2 and the first output of the second differential amplifier 3, 4, whereby then the output current of the circuit is then drawn at the second output of the second differential amplifier 3, 4.

In addition, the first differential amplifier 1, 2 or the diodes 5, 6 can be built up of pnp-transistors.

Figure 2:
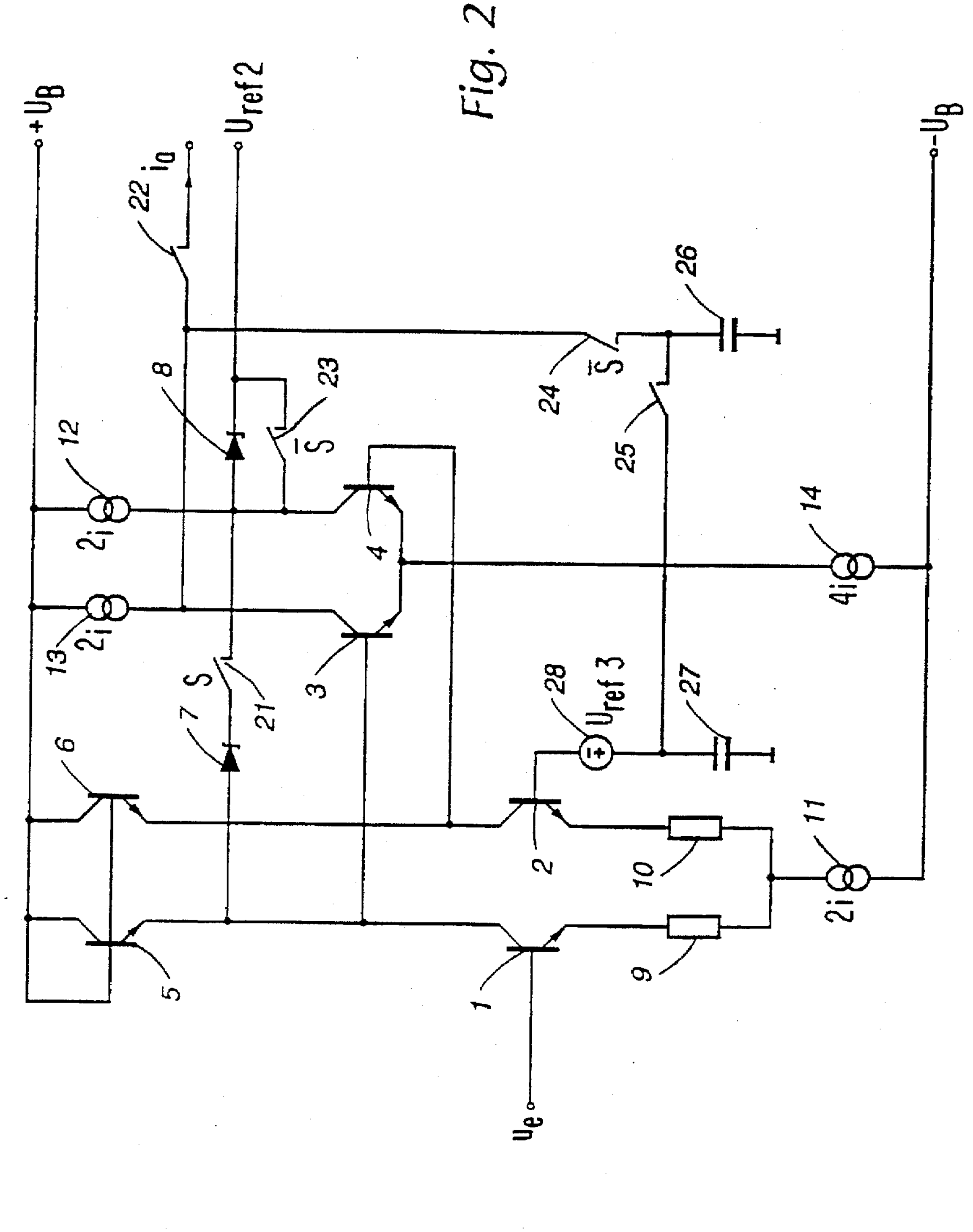
FIG. 2 is a schematic diagram of a circuit arrangement according to a second embodiment of the invention.

The second embodiment, shown in FIG. 2, is based on the first embodiment in FIG. 1. However, the second embodiment contains additional circuit elements, which permit a zero point correction. The switches 21, 22, 23, 24, 25 can be configured as bipolar or unipolar transistors. These are the switches 21, 22, 23, 24, 25 as well as the storage capacitors 26, 27. The voltage at the storage capacitor 27 represents, via a potential shift step 28, the reference voltage at the second input of the first differential amplifier, i.e., at the base of the transistor 2. The input signal, the square root of which is to be formed in the circuit arrangement, is fed in a timed manner to the first input of the first differential amplifier, i.e., the base of the transistor 1. In the time phases during which the square root of the input signal is not formed, the input signal is, according to preconditions, the system zero. Furthermore, the switches 21 to 25 are activated as follows during the time phases: When the input signal is present, the switches 21, 22 and 25 are closed and the switches 23 and 24 are open. The circuit arrangement then functions in the same manner as the circuit arrangement as in FIG. 1. When the system zero voltage is present, the switches 21, 22 and 25 are open and the switches 23 and 24 are closed. This means that during this time phase the current feedback via the diode 7 is interrupted, so that the circuit arrangement does not form the square root of the input signal, but rather has a linear characteristic curve. Furthermore, the diode 8 is short-circuited, so that the corresponding second output of the second differential amplifier is connected directly to the reference voltage $U_{ref2}$. The first output of the second differential amplifier is no longer connected to the output of the circuit arrangement, but rather is connected via the switch 24 to the storage capacitor 26. The capacitor 26 is therefore charged in accordance with the zero point deviation. During the next time phase, when the input signal is again present, a charge balancing is carried out between the storage capacitors 26 and 27 via the closed switch 25. The voltage at the storage capacitor 27 is thus also dependent on the zero point deviation, so that a zero point correction takes place via the reference voltage supplied by it for the first differential amplifier.

The above-described circuit arrangement can, given a suitable choice of feedback, also be designed with transistors of the other conductivity type, or the inputs of the second differential amplifier can be exchanged, or the first differential amplifier can be replaced by another amplifier which functions in the same way with a voltage input and current output.

In addition, it may prove advantageous to decouple the inputs of the second differential amplifier from the outputs of the first differential amplifier (for example, with emitter followers).

It is also possible to replace one or more of the current sources by resistances.

Figure 3:
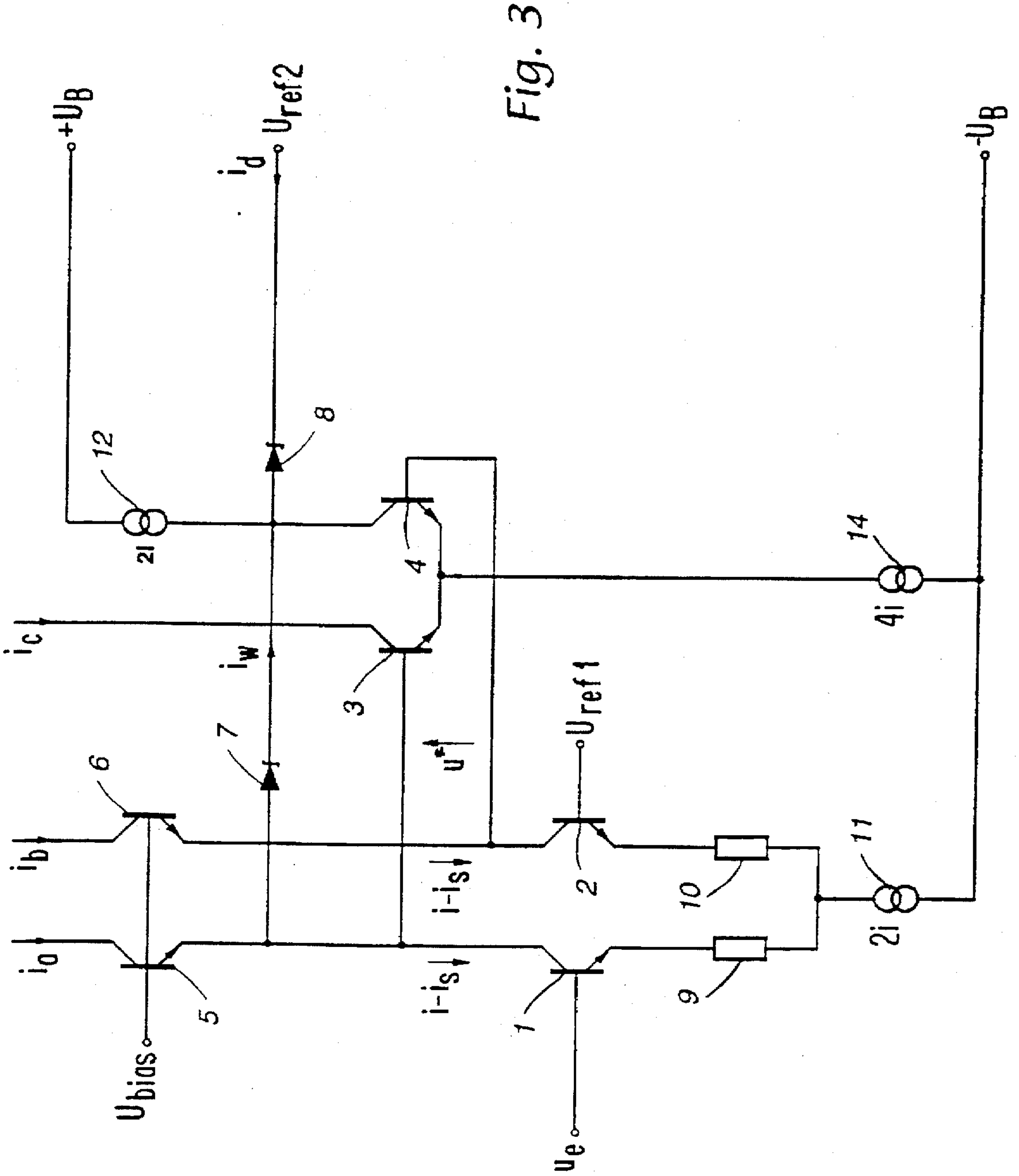
FIG. 3 is a schematic diagram of a circuit arrangement according to a third embodiment of the invention.

The embodiment of FIG. 3 shows a root converter with a symmetrical output. In contrast to the root converter in FIG. 1, the bases of the transistors forming the diodes 5, 6 are laid together on a bias voltage potential $U_{bias}$. The two collectors form additional current outputs $I_a$ and $I_b$. The current source 13 is removed from the first output of the second differential amplifier 3, 4, and the output serves as the additional current output of the circuit. The calculation of the internal currents of the circuit is similar to that in the first embodiment according to FIG. 1.

For $u_e>0$ with $i_s>0$, the following results:

$$i_a = i + i_s + i_w = i + i_s + 2^* \sqrt{ii_s}$$

$$i_b = i - i_s$$

$$i_c = 2i - i_w = 2i - 2^* \sqrt{ii_s}$$

$$i_d = 0$$

For $u_e<0$ with $i_s<0$, the following results:

$i_a=i+i_s$ $i_b=i-i_s$ $i_c=2i-2i_s$ $i_d=2i_s$

A possible combination of the output currents is as follows:

$i_a+i_b-i_c$

The characteristic curve resulting from this rises in monotonic fashion; in the third quadrant it forms a linearly rising function, and in the first quadrant it represents a root function. The monotonically rising function from the summary of the output currents $i_a+i_b-i_c$ is especially advantageous for circuits at in which a zero balance is required.

Another possible combination of the output currents is as follows:

$i_a+i_b-i_c-i_d$

This function is identical to 0 for negative $i_s$-values and for positive $i_s$-values represents a root function in the first quadrant.

Figure 4:
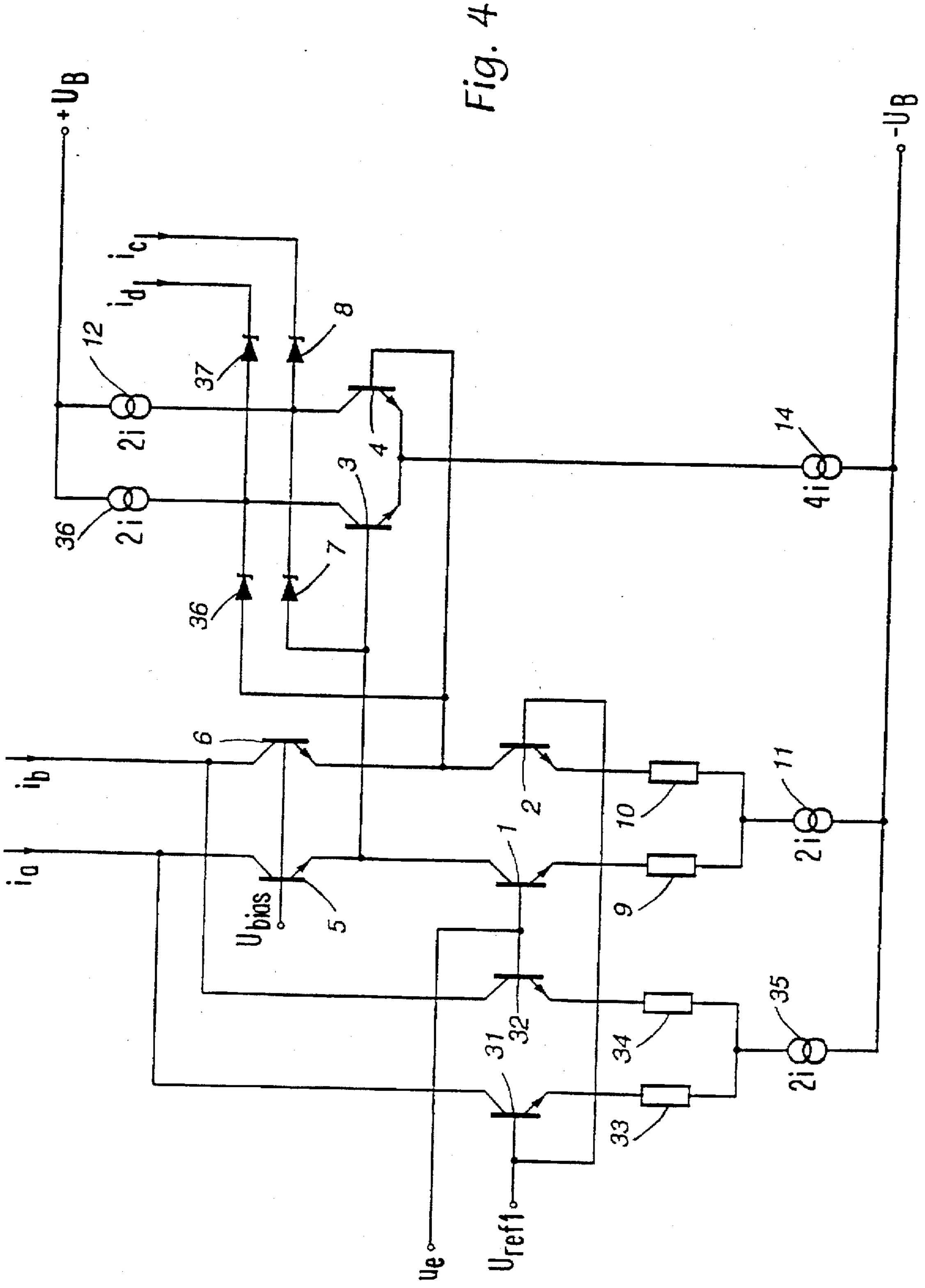
FIG. 4 is a circuit arrangement according to a fourth embodiment of the invention.

The embodiment in FIG. 4 represents a root converter for generating a point-symmetrical output characteristic curve. The circuit corresponds essentially to the root converter according to FIG. 3. In addition, a further differential amplifier 31, 32 is inserted in the input circuit of the circuit. In the particular emitter section, resistances 33, 34 are arranged, which are interconnected together with a current source 35. The differential amplifier 31, 32 is controlled in a manner counter-phasic to the differential amplifier 1, 2. The first input of the additional differential amplifier 31, 34 is connected to the first reference voltage $u_{ref1}$. The first output of the additional differential amplifier 31, 34 works, together with the first output of the first differential amplifier 1, 2, whose input is wired with $u_e$, to the current output $i_a$. The second input of the additional differential amplifier 31, 32 is connected to the input voltage $u_e$. The second output of the additional differential amplifiers 31, 34 works, together with the second output of the first differential amplifier 1, 2, whose input is wired with $U_{ref1}$, to the current output $i_b$. The current source 13 is again connected into the first output of the second differential amplifier, in contrast to the root converter in FIG. 3. In addition, a diode 36 is connected between the second output of the first differential amplifier 1, 2 and the first output of the second differential amplifier 3, 4. The diode 37, like the diode 8, is used for working point stabilization. The cathodes of the diodes 8, 37 serve as the current outputs $i_c$ and $i_d$. The circuit is thus built up completely symmetrically.

For $u_e>0$, $i_w$ closes via the diode 7 and blocks the diode 36. For $u_e<0$, $i_w$ closes via the diode 36 and blocks the diode 7. For the output currents, the following result:

$$u_e > 0 \text{ with } i_s > 0$$
$$i_a = (i - i_s) + (i + i_s + i_w) = 2i + i_w$$
$$i_b = (i + i_s) + (i - i_s) = 2i$$
$$i_c = 0$$
$$i_d = i_w \text{ with } i_w = 2^* \sqrt{ii_s}$$

$$u_e < 0 \text{ with } i_s < 0$$
$$i_a = 2i$$
$$i_b = 2i + i_w$$
$$i_c = -i_w$$

$$i_d = 0 \text{ with } i_w = 2^* \sqrt{ii_s}$$

Suitable combination of the output currents leads to a point-symmetrical output characteristic curve, which represents a root function in the first and third quadrants, respectively. Possible combinations of the output currents are:

$i_a-i_b$ or $i_c-i_d$ or $(i_a-i_b)+(i_c-i_d)$

It should be noted that the output currents $i_a$ and $i_b$ do not lie on the same voltage potential as output currents $i_c$ and $i_d$. For this reason, difficulties may arise when the output currents are interconnected. In order to avoid such problems, the anodes of the diodes 37, 8 can be formed by the emitters of pnp-transistors, the bases of which together are laid on the reference potential $u_{ref2}$. The collectors of the two transistors then serve as the current outputs $i_c$ and $i_d$, respectively. The embodiment shown in FIG. 4 is used primarily in radar and sonar engineering.

Figure 5:
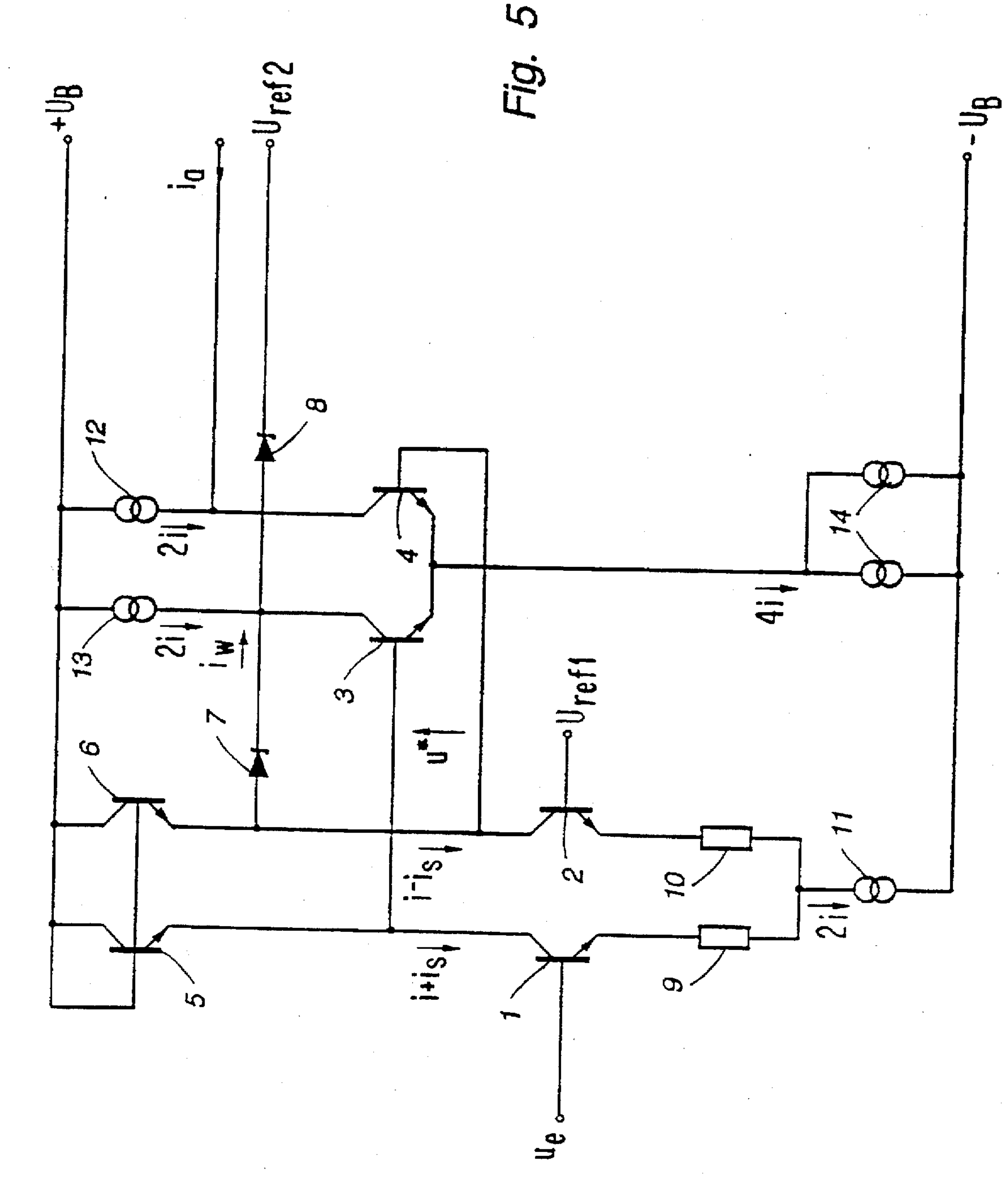
FIG. 5 is a circuit arrangement according to a fifth embodiment.
Figure 6:
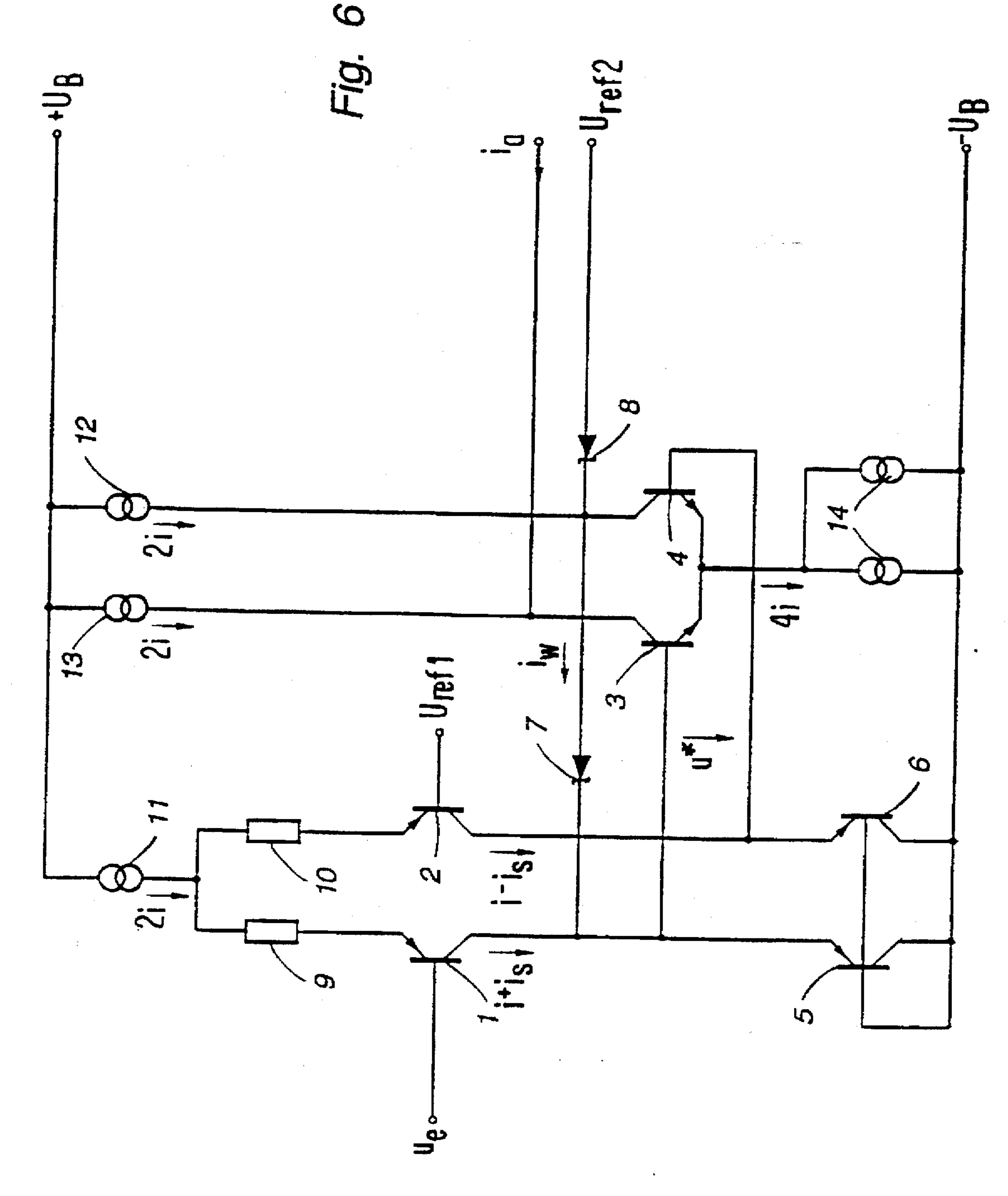
FIG. 6 is a circuit arrangement according to a sixth embodiment.
Figure 7:
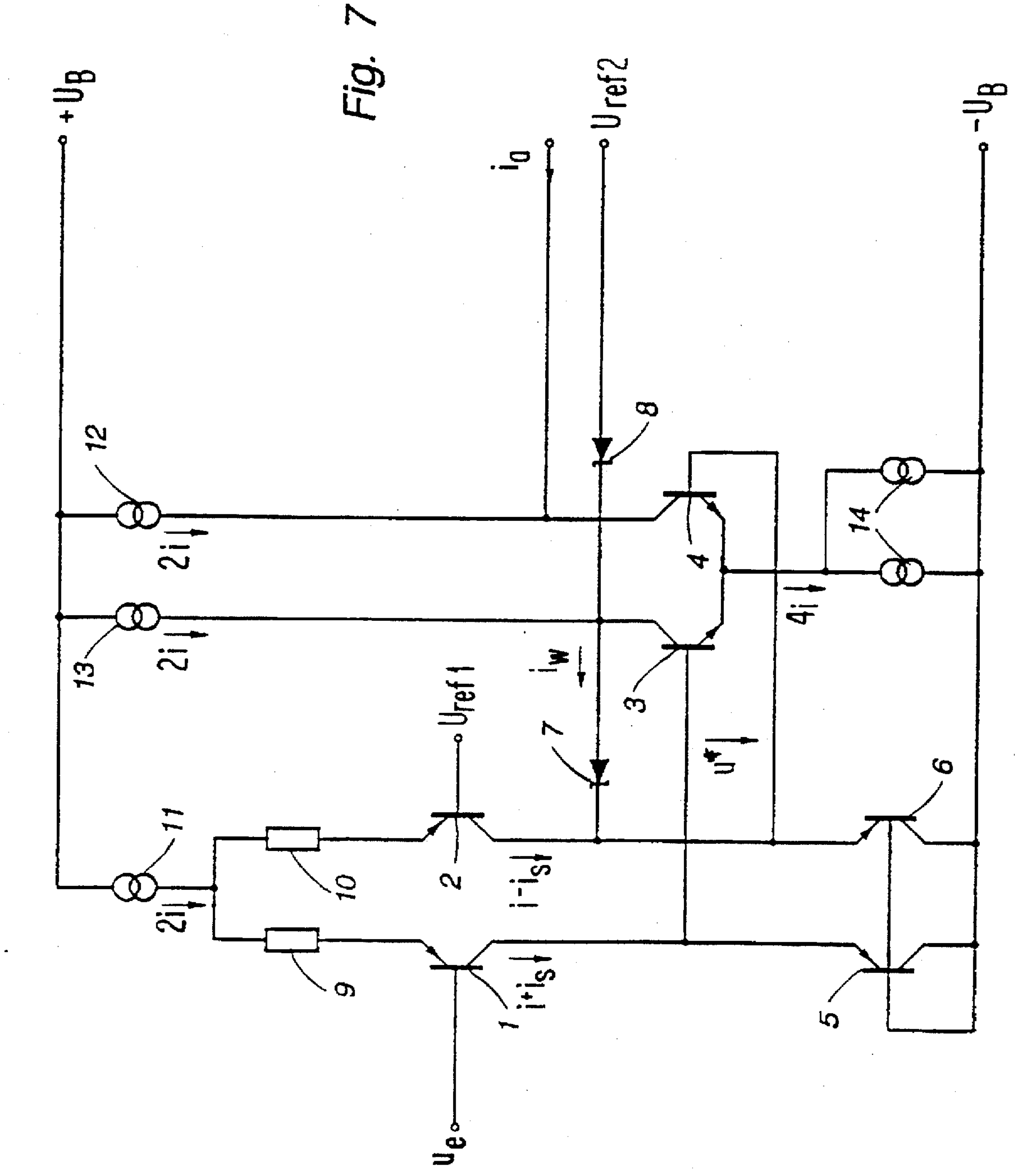
FIG. 7 is a circuit arrangement according to a seventh embodiment.

FIG. 5 shows an embodiment in which the first and second differential amplifiers are formed of npn-transistors. The anode of the diode 7 is connected to the second output of the first differential amplifier, while the cathode of the diode 7 is connected to the first output of the second differential amplifier. In FIG. 6, the first differential amplifier is formed of pnp-transistors and the second differential amplifier is formed of npn-transistors. The diode 7 has a cathode connected to the first output of the first differential amplifier and an anode connected to the second output of the second differential amplifier. FIG. 7 shows the cathode of the diode 7 connected to the second output of the first differential amplifier. A further diode 8 is shown in FIG. 6 having a cathode connected to the second output of the second differential amplifier, and an anode connected to the second reference voltage source $U_{ref2}$.

It is further beneficial if the first and second diodes 5, 6 and the second differential amplifier are integrated on or at a single substrate.

The invention is not limited by the embodiments described above which are presented as examples only but can be modified in various ways within the scope of protection defined by the appended patent claims.

We claim:

1. A circuit arrangement for forming the square root of an input signal in at least one quadrant, comprising:

a first reference voltage source;

an operating voltage source;

a first diode having first and second connecting terminals and a polarity in a flow direction;

a second diode having first and second connecting terminals and polarity in a flow direction, the second connecting terminals of the first and second diodes being connected to the operating voltage source;

a first differential amplifier configured as a linear voltage-current converter, the first differential amplifier having a first output, a second output, a first input that forms an input of the circuit arrangement, and a second input connected to the first reference voltage source, the first and second outputs being respectively connected to the first connecting terminal of the first diode and the second diode;

a second differential amplifier having a first output and a second output, one of the outputs forming an output of the circuit arrangement, a first input connected to the first output of the first differential amplifier, and a second input connected to the second output of the first differential amplifier;

a first current source connected between the first output of the second differential amplifier and the operating voltage source;

a second current source connected between the second output of the second differential amplifier and the operating voltage source; and a third diode connected between the other of the first and second outputs of the second differential amplifier and one of the outputs of the first differential amplifier.

2. A circuit arrangement as defined in claim 1, wherein the first and second differential amplifiers are formed of npn-transistors, the third diode having an anode connected to the first output of the first differential amplifier and a cathode connected to the second output of the second differential amplifier.

3. A circuit arrangement as defined in claim 1, Wherein the first and second differential amplifiers are formed of npn-transistors, the third diode having an anode connected to the second output of the first differential amplifier and a cathode connected to the first output of the second differential amplifier.

4. A circuit arrangement as defined in claim 1, wherein the first differential amplifier is formed of pnp-transistors and the second differential amplifier is formed of npn-transistors, the third diode having a cathode connected to the first output of the first differential amplifier and an anode connected to the second output of the second differential amplifier.

5. A circuit arrangement as defined in claim 1, wherein the first differential amplifier is formed of pnp-transistors and the second differential amplifier is formed of npn-transistors, the third diode having a cathode connected to the second output of the first differential amplifier and an anode connected to the first output of the second differential amplifier.

6. A circuit arrangement as defined in claim 1, and further comprising a second reference voltage source and a fourth diode having a cathode connected to the second reference voltage source, and an anode, the second output of the second differential amplifier being connected to the anode of the fourth diode.

7. A circuit arrangement as defined claim 1, and further comprising a second reference voltage source and a fourth diode having an anode connected to the second reference voltage source, and a cathode, the second output of the second differential amplifier being connected to the cathode of the fourth diode.

8. A circuit arrangement as defined in claim 1, and further comprising:

a second reference voltage source;

a first storage capacitor;

a second storage capacitor, the first reference voltage source being configured as a potential shift step arranged to connect the second storage capacitor to the second input of the first differential amplifier;

first switch means for selectively connecting the first storage capacitor to the second storage capacitor;

second switch means for selectively interrupting connection between the third diode and the second output of the second differential amplifier and connecting the second output of the second differential amplifier to the second reference voltage source; and third switch means for selectively isolating the first output of the second differential amplifier from the output of the circuit arrangement and connecting the first output of the second differential amplifier to the first storage capacitor.

9. A circuit arrangement as defined in claim 8, wherein at least one of the switching means includes at least one switch configured as a bipolar transistor.

10. A circuit arrangement as defined in claim 8, wherein at least one of the switching means includes at least one switch configured as a unipolar transistor.

11. A circuit arrangement as defined in claim 1, wherein the first differential amplifier and the second differential amplifier each have an emitter branch, and further comprising current source means arranged in the emitter branch of the second differential amplifier for providing a current in the emitter branch of the second differential amplifier that is twice as large as a current in the emitter branch of the first differential amplifier.

12. A circuit arrangement as defined in claim 6, wherein the third diode and the fourth diode are Schottky diodes.

13. A circuit arrangement as defined in claim 7, wherein the third diode and the fourth diode are Schottky diodes.

14. A circuit arrangement as defined in claim 1, wherein the first and second diodes are configured as transistors, each of the transistors having a base-collector section, the base-collector sections of the transistors being connected to one another.

15. A circuit arrangement for forming the square root of an input signal in at least one quadrant, comprising:

a first reference voltage source;

an operating voltage source;

a first diode having first and second connecting terminals and a polarity in a flow direction;

a second diode having first and second connecting terminals and polarity in a flow direction, the second connecting terminals of the first and second diodes forming current outputs;

a first differential amplifier configured as a linear voltage-current converter, the first differential amplifier having a first output, a second output, a first input that forms an input of the circuit arrangement, and a second input connected to the first reference voltage source, the first and second outputs being respectively connected to the first connecting terminal of the first diode and the second diode;

a second differential amplifier having a first output that forms a current output that forms the square root of the input signal, a second output, a first input connected to the first input of the first differential amplifier and a second input connected to a second output of the first differential amplifier;

a current source connected between the second output of the second differential amplifier and the operating voltage source;

a third diode connected between the second output of the second differential amplifier and one of the outputs of the first differential amplifier; and a fourth diode connected to the second output of the second differential amplifier so as to form a current output.

16. A circuit arrangement as defined in claim 15, wherein the first and second diodes are configured as transistors, the transistors having bases which are subject to a common base voltage potential and collectors which form the current outputs.

17. A circuit arrangement as defined in claim 1, and further comprising a substrate, the first and second diodes and the second differential amplifier being mounted to the substrate.

* * * * *